United States Patent
Ramanathan et al.

(10) Patent No.: US 11,212,134 B2
(45) Date of Patent: Dec. 28, 2021

(54) BUILDING AUTOMATION SYSTEM PROVIDING FOR INTEGRATION OF SUBSYSTEMS

(71) Applicant: Siemens Schweiz AG, Zurich (CH)

(72) Inventors: Ganesh Ramanathan, Unterageri (CH); Andreas Hennig, Unterageri (CH); Thomas W. Anderson, Jr., Lakemoor, IL (US)

(73) Assignee: Siemens Schweiz AG, Zurich (CH)

( * ) Notice: Subject to any disclaimer, the term of this patent is extended or adjusted under 35 U.S.C. 154(b) by 164 days.

(21) Appl. No.: 16/133,577

(22) Filed: Sep. 17, 2018

(65) Prior Publication Data
US 2020/0092126 A1 Mar. 19, 2020

(51) Int. Cl.
*H04L 12/28* (2006.01)

(52) U.S. Cl.
CPC ........ *H04L 12/2827* (2013.01); *H04L 12/281* (2013.01); *H04L 12/2812* (2013.01); *H04L 12/2816* (2013.01)

(58) Field of Classification Search
CPC ............. H04L 12/2827; H04L 12/2816; H04L 12/2812; H04L 12/281
See application file for complete search history.

(56) References Cited

U.S. PATENT DOCUMENTS

| | | | | |
|---|---|---|---|---|
| 10,341,444 | B2* | 7/2019 | Adams | H04L 67/16 |
| 2006/0067209 | A1* | 3/2006 | Sheehan | H04L 67/125 370/216 |
| 2007/0055759 | A1* | 3/2007 | McCoy | G05B 15/02 709/223 |
| 2014/0207759 | A1* | 7/2014 | Park | G06F 16/24522 707/722 |
| 2014/0371878 | A1* | 12/2014 | Lee | H04L 41/0233 700/19 |
| 2017/0318106 | A1* | 11/2017 | Kim | H04L 67/24 |

\* cited by examiner

*Primary Examiner* — Mohammad Ali
*Assistant Examiner* — Vincent W Chang

(57) ABSTRACT

There is described a building automation system comprising a control center and an adapter for providing integration of subsystems. The adapter facilitates communications between the control center and a subsystem of the building automation system. A subsystem library of the control center receives an object model associated with the subsystem from the user interface. An extraction tool of the control center generates output information based on the object model. The control center is mapped to the adapter, so that a thing description may be communicated there between. The thing description includes a description of instances hosted by the adapter and representing the object model. An auto discovery component of the control center creates instances of the object model based on the thing description and addresses properties of the object model. The building automation system utilizes the instances and the addresses to manage the subsystem associated with the object model.

17 Claims, 6 Drawing Sheets

BUILDING AUTOMATION SYSTEM PROVIDING FOR INTEGRATION OF SUBSYSTEMS

BACKGROUND

Field

This application generally relates to the field of building automation systems and, more particularly, systems and methods for integrating subsystems and devices into a building automation system.

Description of Related Art

Building automation systems provide the capability of managing building management components from a central interface or location. These building management components include various equipment for controlling lighting, power, heating, ventilation, air conditioning, fire safety, and security. The building automation systems provide operational and sustainability benefits to building developers, managers, and occupants.

Integration of subsystems in a building automation system involves a complex series of development tasks. Sensors, actuators, and controllers used for building automation may use a variety of modes of communication, which may vary based on the standard or proprietary communication protocols utilized. Integration efforts are particularly daunting for integrating a $3^{rd}$ party subsystem, because knowledge about the intricacies of the building automation system, the $3^{rd}$ party subsystem, and the various components needed to establish communications between them is necessary. Development of the components needed for integration may be complicated and time-consuming, thus impacting substantially a developer's ability to integrate a substantial number of systems and components to the building automation system.

SUMMARY

Briefly described, there are described an open and easy-to-use framework for quickly developing subsystems and devices for integration into a building automation system. The framework facilitates development of supporting components, such as communication drivers, tools, and data importers, for the various subsystems and devices. In contrast to conventional techniques, the framework reduces the amount of time required for developing subsystem integrations of devices as well as the amount of knowledge about the building automation system required for such development.

One aspect is a building automation system providing for integration of subsystems comprising a control center and an adapter. The adapter facilitates communications between the control center and a subsystem of the building automation system. The control center comprises a subsystem library, a user interface, an extraction tool, and an auto discovery component. The subsystem library is configured to receive an object model associated with the subsystem from the user interface. The object model includes a list of properties associated with the object being integrated. The extraction tool is configured to generate output information based on the object model. The output information includes object-oriented classes and programming types representing the object model, and the adapter is configured based on the output information. The first system interface of the control center is mapped to a second system interface of the adapter, so that the thing description may be communicated from the second system interface of the adapter to the first system interface of the control center. The thing description includes a description of instances hosted by the adapter and representing the object model. The auto discovery component creates instances of the object model based on the description of instances and addressing the properties with resource addresses. The building automation system utilizes the instances and the resource addresses to manage the subsystem associated with the object model.

Another aspect is a method of a building automation system for integration of subsystems. An object model associated with a subsystem of the building automation system is received, at a subsystem library of a control center, from a user interface of the control center. The object model includes a property associated with the object model. Next, output information is generated at an extraction tool of the control center based on the object model. The output information includes object-oriented classes and programming types representing the object model. An adapter is then configured based on the output information, and a first system interface of the control center is mapped to a second system interface of the adapter. Next, a thing description is communicated from the second system interface of the adapter to the first system interface of the control center. The thing description includes a description of instances hosted by the adapter and represents the object model. Thereafter, instances of the object model are created at an auto discovery component of the control center based on the description of instances and the properties are addressed with resource addresses. The building automation system utilizes the instances and the resource addresses to manage the subsystem associated with the object model.

Yet another aspect is a non-transitory computer readable medium including executable instructions which, when executed, cause at least one processing to provide for integration of subsystems. An object model associated with a subsystem of the building automation system is received, in which the object model includes properties associated with the object model. Next, output information is generated based on the object model, in which the output information includes object-oriented classes and programming types representing the object model. An adapter is then configured based on the output information. Next, a thing description is communicated from the adapter to the control center, in which the thing description includes a description of instances hosted by the adapter and represents the object model. Thereafter, instances of the object model are created based on the description of instances and the properties are addressed with resource addresses.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

To facilitate an understanding of embodiments, principles, and features of the present invention, they are explained hereinafter with reference to implementation in illustrative embodiments. In particular, they are described in the context of a building automation system and method for facilitating integration of subsystems and devices. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

There is described an ecosystem where 3rd party developers may integrate subsystems into a building automation system with limited knowledge of, and minimal coding effort for, the building automation system. The developer is provided a software development kit for implementing an adapter where the developer may create an adapter to perform communication functions not natively available by the building automation system. The developer is able to create and program the adapter easily by providing information about an object model for the subsystem and a communications driver to talk to the subsystems to be integrated and map their protocol to an interface of the adapter framework.

The building automation system enables development and integration of subsystems by isolating each subsystem within a well-contained component based on standard web technologies. In particular, an adapter functions as a standardized web interface for isolated conversion of legacy or proprietary protocols. Examples of standardized web interfaces for implementing web services and interoperability of computer systems over a network include, but are not limited to, HTTP and Simple Object Access Protocol (SOAP). The system also integrates subsystems implemented on global communications standards, such as BACnet, OPC, Modbus, IEC 61850, SNMP, and ONVIF, for broad range compatibility.

Figure 1:
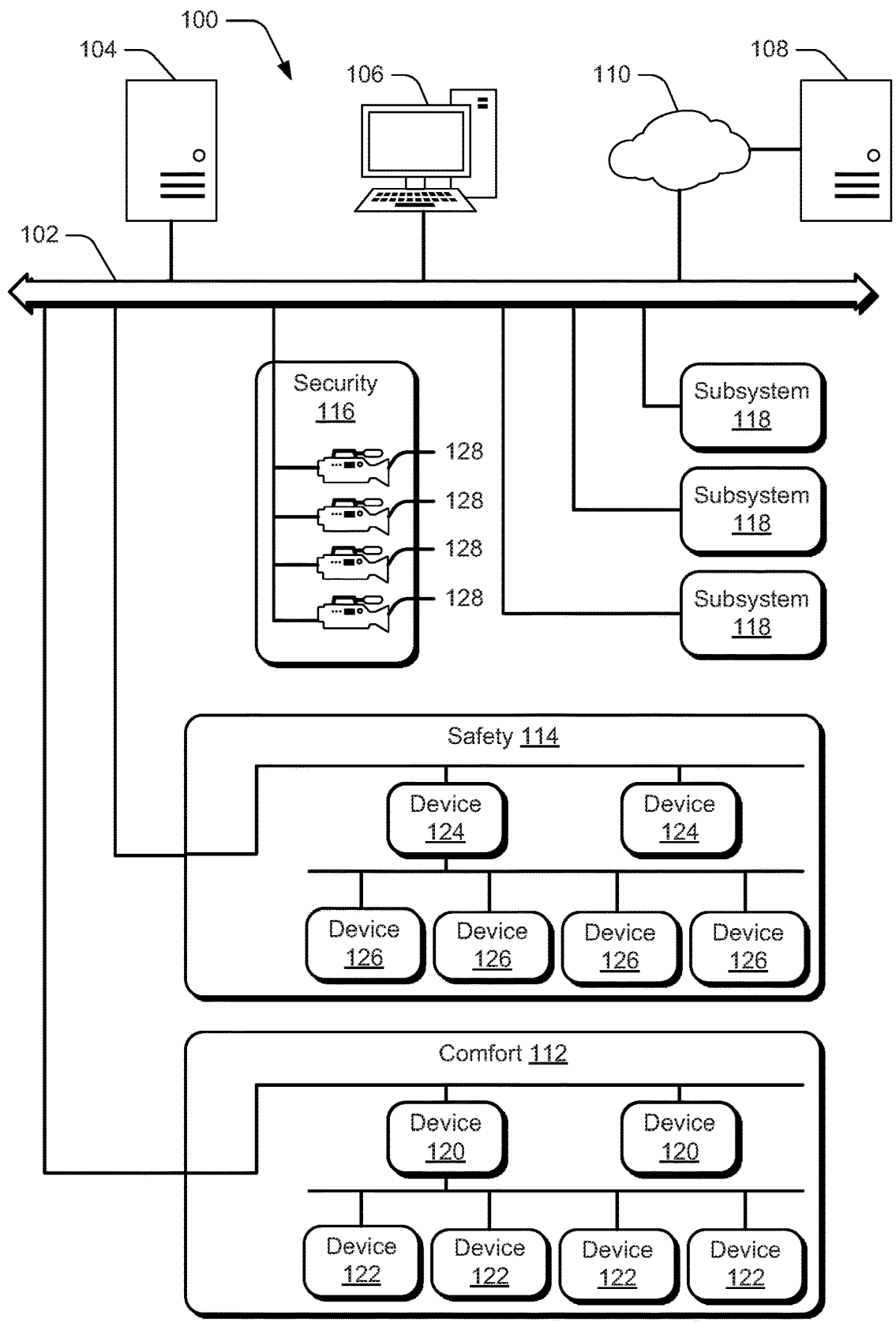
FIG. 1 illustrates schematically a building automation system in accordance with an example embodiment of the present invention.

FIG. 1 illustrates schematically a building automation system 100 in which disclosed embodiments may be implemented. The building automation system 100 is an environmental control system configured to control one or more environmental parameters for a building, such as temperature, humidity, ventilation, lighting, fire safety, security, and the like. For example, the building automation system 100 may comprise one or more network connections or buses 102 to manage northbound connectivity, management level, and southbound connectivity for the system. For one embodiment, the example building automation system 100 may comprise one or more management devices, such as a server 104, a workstation 106, or a remote device 108 connecting through a wired or wireless network connection 110, that allows the setting and/or changing of various controls of the system. While a brief description of the building automation system 100 is provided below, it will be understood that the building automation system 100 described herein is only one example of a particular form or configuration for a building automation system and that the system 100 may be implemented in any other suitable manner without departing from the scope of this disclosure.

The management devices 104, 106, 108, are configured to provide overall control and monitoring of the building automation system 100. The management devices 104, 106, 108 may operate as data servers that are capable of exchanging data with various elements of the system 100. As such, the management devices 104, 106, 108 may allow access to system data by various applications that may be executed on the management devices 104, 106, 108 or other supervisory devices. For example, each management device 104, 106, 108 may be capable of communicating with each other via the network connection or bus 102 or with other supervisory computers, Internet gateways, other gateways, or other external devices. Also, each management device 104, 106, 108 may be configured to accept modifications and/or other inputs from a user. This may be accomplished via a user interface of the management device 104, 106, 108 or any other user interface that may be configured to communicate with the management device through any suitable network or connection. Each management device 104, 106, 108 may be configured to, among other things, affect or change operational data of the various subsystems of the building automation system 100.

For the illustrated embodiment, the building automation system 100 provides southbound connectivity to subsystems for various environmental parameters such as components of comfort systems 112, safety systems 114, security systems 116, and other systems 118. For example, comfort systems 112 may include various devices 120, 122 for monitoring and controlling heating, cooling, and ventilation of areas within a building or group of buildings. Examples of comfort devices include, but are not limited to, stations, field panels, field controllers, field devices, and the like. Some devices 120 may communicate directly with a network connection or bus 102, whereas other devices 122 may communicate through, and perhaps be controlled by, another device. Similarly, safety systems 114 may include various devices 124, 126 for monitoring and controlling fire protection for areas within a building or a group of buildings. Examples of safety devices include, but are not limited to, controllers, control panels, detectors, alarm systems, video surveillance cameras, and the like. Similar to comfort devices, some safety devices 124 may communicate directly with a network connection or bus 102, whereas other safety devices 126 may communicate through, and perhaps be controlled by, another device. As stated above, the illustrated embodiment of the building automation system 100 may provide southbound connectivity to subsystems 128 for security systems 116 and other types of subsystems 118, such as video surveillance cameras and motion detectors, for monitoring and controlling various areas within a building or a group of buildings. The subsystems 118-128 may include legacy or 3rd party devices to be integrated with other devices of the building automation system 100. It is to be understood that the system 100 may comprise any suitable number of any of components 120-128 based on the particular configuration for each building or group of buildings.

Figure 2:
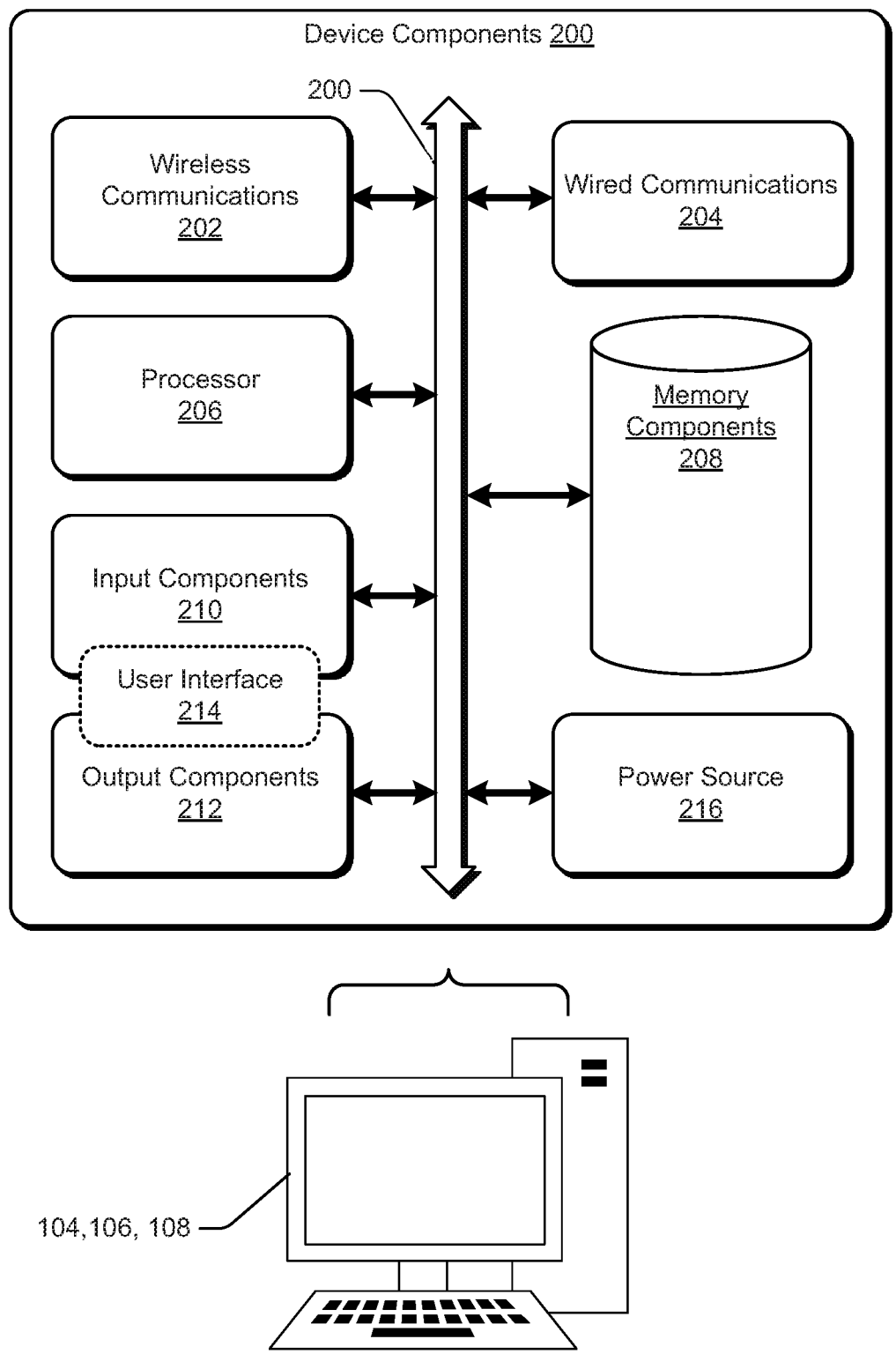
FIG. 2 illustrates a block diagram of a management device of the building automation system in accordance with an example embodiment of the present invention.

FIG. 2 is an example representation of the various components 200 of each management device 104, 106, 108 of the building automation system 100. Each management device 104, 106, 108 may be a server 104, a workstation 106, a remote device 108, or other type of device for management and control of one or more aspects of the building automation system 100. The device components 200 of each management device 104, 106, 108 comprise a communication component, such as one or more wireless communication components 202 and/or one or more wired communication components 204, as well as one or more processors 206 and one or more memory components 208. The wireless communication component 202 of the example device components 200 may utilize wireless technology for communication, such as, but are not limited to, satellite-based and cellular-based communications and their variants as well as wireless local area network (WLAN) communication and their variants, such as infrastructure, peer-to-peer, ad hoc, bridge, and wireless distribution based communications. Examples of WLAN communications include, but are not limited to, IEEE 802.11 (Wi-Fi), IEEE 802.16 (WiMAX), Bluetooth, BLE, and ZigBee. Wireless communications may further include other forms of communication such as microwave or infrared technology (IR). The wired communication component 204 of the example device components 200 utilizes any type of transmission of data over a physical conduit, such as an electrical cable or optical fiber cable.

The processor 206 may execute code and process data received other components of the device components 200, such as information received at the wireless communication component 202, received at the wired communication component 204, or stored at the memory component 208. The code associated with the building automation system 100 and stored by the memory component 208 may include, but is not limited to, operating systems and applications, such as programming types, software development kits (SDKs), extension modules, drivers, and the like. The data associated with the building automation system 100 and stored by the memory component 208 may include, but is not limited to, information, such as object models and their associated properties and descriptions, classes, mapping information, address information, and the like. Each operating system includes executable code that controls basic functions of the management device 104, 106, 108, such as interactions among the various components of the device components 200, communication with external devices via wireless and wired communication components 202, 204, and storage and retrieval of code and data to and from the memory component 208. Each application includes executable code to provide specific functionality for the processor 206 and/or remainder of the management device 104, 106, 108. Data is information that may be referenced and/or manipulated by an operating system or application for performing functions of the management device 104, 106, 108.

The device components 200 of each management device 104, 106, 108 may further comprise one or more input components 210 and one or more output component 212. The input components 210 of the device components 200 may include a video input component, an audio input component, and a mechanical input component. Likewise, the output components 212 of the device components 200 may include a variety of video, audio and/or mechanical outputs.

Each management device, particularly the workstation 106, may comprise a user interface for interaction with a user of the management device. Although a server 104 or a remote device 108 may include a user interface 214, the workstation 106 includes a combination of hardware and software to provide a user with a desired user experience. The user interface 2014 of the workstation 106 may include one or more input components to allow the user to enter information and one or more output components to provide information to the user. Although the user interface 214 may include all input components 210 and all output components 212 of the workstation 106, the user interface 214 may also be directed to a specific subset of input components and/or output components. For example, the user may provide information via the user interface 214, in the form of a graphical user interface, to a subsystem library of the workstation 106, and receive feedback from the graphical user interface as a result of providing this information.

The device components 200 may further comprise a power source 216, such as a power supply or a portable battery, for providing power to the other device components 200 of each management device 104, 106, 108 of the building management system 100.

It is to be understood that FIG. 2 is provided for illustrative purposes only and for illustrating device components 200 of a management device 104, 106, 108, and is not intended to be a complete diagram of the various components that may be utilized by the device. Therefore, management device 104, 106, 108 may include various other components not shown in FIG. 2, may include a combination of two or more components, or a division of a particular component into two or more separate components, and still be within the scope of the present invention.

Figure 3:
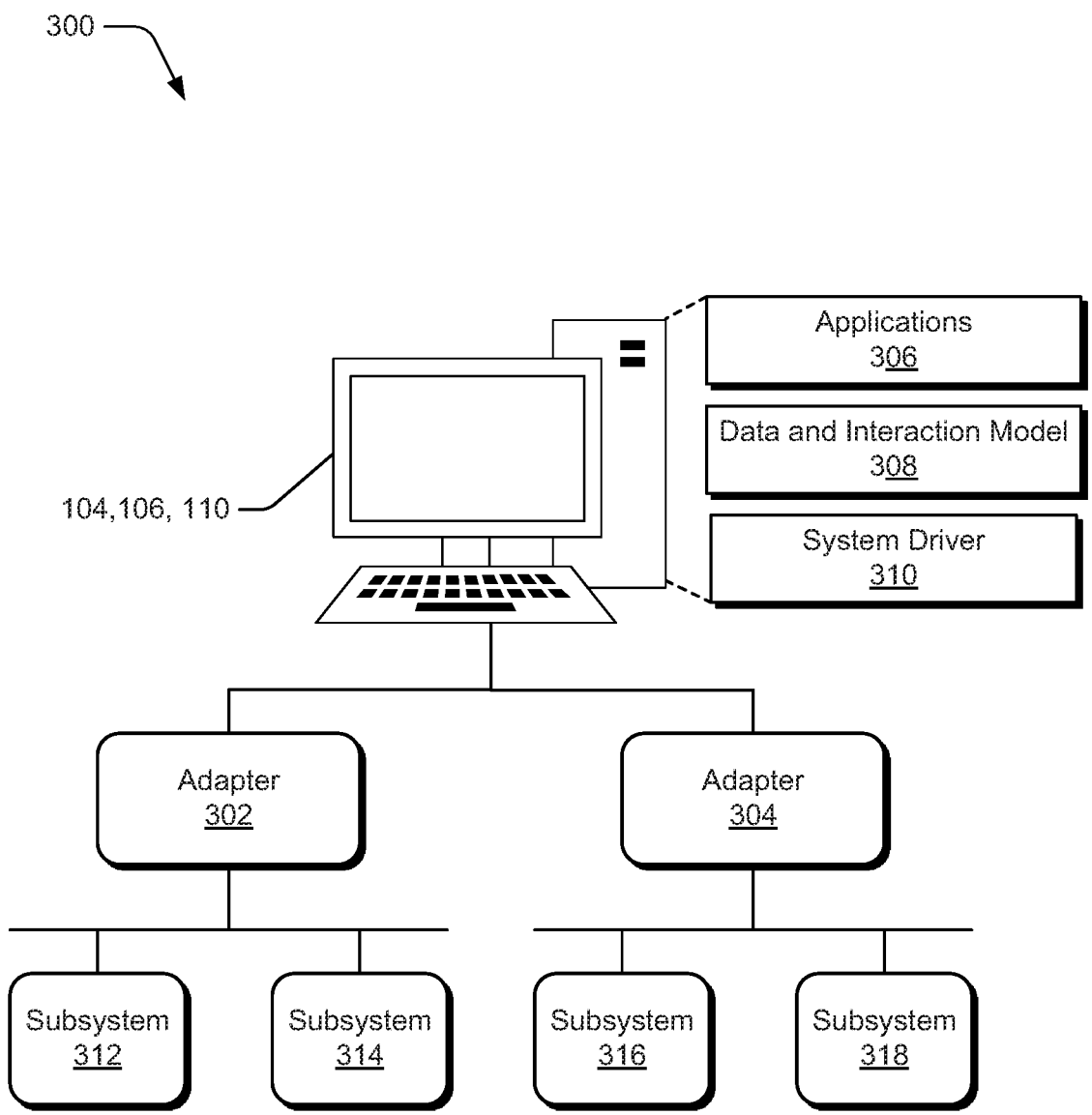
FIG. 3 illustrates schematically operational components of the management device of the building automation system in accordance with an example embodiment of the present invention.

FIG. 3 illustrates schematically operational components of the management device 104, 106, 108 of the building automation system 100. The management device 104, 106, 108 comprises one or more adapters 302, 304 to enable development of subsystem integration by isolating each subsystem within a well-contained ecosystem based on standard web technologies. In particular, the adapter 302, 304 performs the conversion of legacy protocols to a standardized interface in a separate, isolated process space, which is fully agnostic of any communication protocols of the management device 104, 106, 108. The management device 104, 106, 108 establishes an interaction channel with each adapter 302, 304 by conforming to the standard web technology. Examples of the standard web technologies include, but are not limited to, Representational State Transfer (REST) or HTTP The operational components of the management device 104, 106, 108 include applications 302, a data and interaction model 304, and a system driver 306. The application 302 includes specific building management functions such as building automation, fire and life safety, lighting-IP cameras, and power & energy, as well as general building management functions such as reporting, analysis, scheduling, and analytics. The data and interaction model 304 facilitates interaction with subsystems by conforming communications to standardized protocols, such as HTTP. The system driver 306 communicates with the adapter in accordance with the data and interaction model 304. For example, the system driver 306 may communicate with each adapter 302, 304 via a web-based messaging protocol such as Hypertext Transfer Protocol (HTTP). In this manner, each adapter 302, 304 of the management device 104, 106, 108 harmonizes data communications and interactions between the management device and the interconnected subsystems 312-318.

Figure 4:
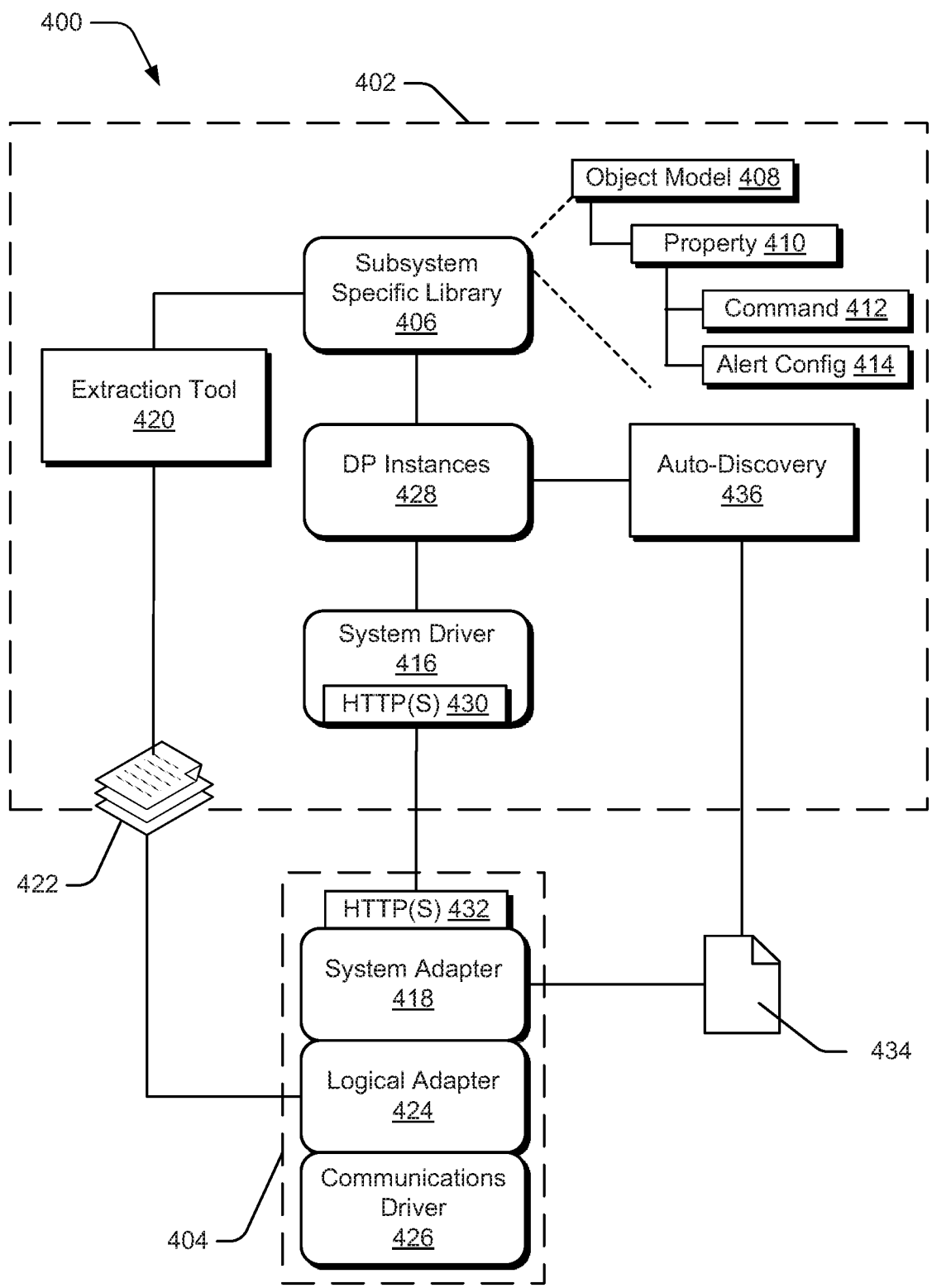
FIG. 4 illustrates schematically, in detail, certain aspects of the operational components of FIG. 3 in accordance with an example embodiment of the present invention.

Referring to FIG. 4, there is shown an integration workflow 400 providing detailed information about the operational components of the management device 104, 106, 108. FIG. 4 provides representations of a control center 402 and an adapter 404 separate and distinct from the control center 402. It is to be understood that, although the adapter 404 may be separate from the control center 402 before being configure, the adapter will be integrated with the control center (along with the associate subsystem) after being configure by a communication link created between the control center and the adapter by the integration workflow 400. Also, for some embodiments, each subsystem of the building automation system 100 includes a device to be managed by the control center 402, and each subsystem is associated with at least one of building lighting, building ventilation, building safety, or building security.

The integration workflow 400 is divided into separate streams of activities which are, to a large extent, independent of each other. The first part of the integration workflow 400 involves modelling of the data at the management device 104, 106, 108 using object models 408. A subsystem library 406 of the control center 402 is configured to receive one or more object models 408 associated with a subsystem of the building automation system. The subsystem may have various structures to model its datapoints. For example, the subsystem structure may be based on a flat address space of information (such as Modbus®, which is a registered trademark of Schneider Electric USA, Inc.), object-oriented (such as BACnet), or nested hierarchies of objects (such as IEC61850). The object model or models 408 are received from a user interface of the control center 402 or, more particularly, a user interface 214 of the managing device 104, 106, 108 incorporating the control center. The object model 408 includes properties 410 associated with the object model. The object models 408 may be created in the subsystem library 406 of the control center 402 to suit the subsystem being integrated, or based on an existing object model, in whole or in part, if the existing object model fits the data structures available in the subsystem. Each object model 408 comprises one or more properties 410 associated with the object model, and the properties of each object model may include a command 412, an alert event 414, or both, that are associated with the object model. Examples of properties include, but are not limited to, temperature, humidity, status, power, and the like. As a result of creating the object model or object models, the managing device 104, 106, 108 may execute the necessary steps to create a communication link between a system driver 416 of the control center 402 and a system adapter 418 of the adapter 404 in order to integrate the subsystem in the building automation system 100, as described below.

A key aspect of information modelling in control center 402 is that entities are modelled as "datapoint objects", each of which contains one or more "properties". These terms are often also called "datapoint types" and "datapoint elements", respectively. Datapoint objects act as container for the properties and provide some meta-information in the form of key-value pairs. The properties themselves are the real carriers of the process data (like temperature, humidity, status, etc.), which are expressed as one of several primitive types (like Boolean, float, string etc.). In addition to holding the process data, properties also contain several configuration information which enables its specific interpretation and processing by services and applications in control center 402.

Once the object models 408 are created in the subsystem library 406, an extraction tool 420 of the control center 402 is configured to generate output information 422 based on the object model 408. An example of an extraction tool may be an export application or snap-in for the control center 402. The output information 422 are export files that include object-oriented classes and programming types representing the object model 408. For example, the object-oriented classes representing the object model 408 may be Resource Description Framework (RDF) classes, and the programming types may be programming language specific abstract types representing the object model may be in the form of Java® (Java is a registered trademark of Oracle America, Inc.), C#, or some other programming language. The RDF classes may be a file that describes the object in an open standard format, thus decoupling any control center dependency in the adapter 404. The file includes relationship information of the object to properties and their data types. The programming types may be used to create instances of the subsystems to be integrated in the building automation system. As another example, the output information 422 may further include a specification document describing the object model as data-definition aspects and endpoints representing the properties 410 of the object model 408, such as a Swagger document. The specification document may be used to generate a test client for the adapter 404 that may read and write the properties of the subsystem as well as a client library to test the application. Thus, for some embodiments, the extraction tool 420 may export the object models 408 as RDF documents, translate the object models to abstract types in programming specific models (such as Java® and C#), and product a Swagger document which describes the REST endpoints to interact with instances of the object models.

The adapter 404 is configured based on the output information 422 generated by the extraction tool 420. The adapter 404 provides adaptation of legacy protocol data structures to web resources for management device 104, 106, 108. The adapter 404 may be created by a developer taking into account that the process data are exposed as resources. Alternatively, standard template or framework code (based on, for example, in Java®, C#, or similar programming language) may be used to facilitate the process. The object-oriented classes of the output information 422, in particular, may be used to configure the adapter 404 and, for some embodiments, instances of the classes may be hosted as RESTful resources. The output information 422 are compiled into the adapter 404 so that the adapter may create instances of the objects.

The adapter 404 includes a system adapter 418, a logical adapter 424, and a communications driver 426. The system adapter 418 sets up a web server that uses a web protocol, such as Hypertext Transfer Protocol (HTTP), to provide process values to clients in response to properties requested. The adapter 404 may also include initialize data to identify objects in the subsystem, read data to read each property of the plurality of properties, and write data to write each property of the plurality of properties. For example, the system adapter 418 of the adapter 404 may also call an Initialize( ) function in the logical adapter 424 on startup and, then, call Read( ) and Write( ) functions in response to a client request. Thus, Initialize( ), Read( ), and Write( ) hooks are implemented at the logical adapter 424. The logical adapter 424 also provides support for writing to the console and processing command line arguments. The communications driver 426 is provided by a developer of the associated subsystem and provides communication to the subsystem or devices to be integrated in the building automation system. The communications driver 426 includes the capability of discovering subsystem objects and supports the capabilities of reading and writing of properties as appropriate for the integration.

The second part of the integration workflow 400 involves the creation of instances 428 of the object model in the control center 402 to facilitate the development of a communication link between the control center and the adapter 404. The communication link is developed between the system driver 416 of the control center 402 to the system adapter 418 of the adapter 404. In particular, the system driver 416 includes a first system interface 430 and the system adapter 418 includes a second system interface 432, in which the first and second system interfaces are mapped to each other. For example, each of the first and second system interfaces 430, 432 may be HTTP endpoints such that communications via the link there between utilizes Hypertext Transfer Protocol. The system adapter 418 may generate a description of instances 434, i.e., thing description, hosted at the system adapter and representing the object model and provide the thing description to the control center 402. The thing description 434 is communicated from the second system interface 432 of the adapter 404 to the first system interface 430 of the control center 402. For some embodiments, the second system interface 432 may be an HTTP endpoint of a REST server that provides the description of the instances 434 in the form of RDF documents serialized in JavaScript Objection Notation (JSON) to the first system interface 430 which is an HTTP endpoint of the system driver 416.

For some embodiments, the system driver 416 may poll property values as they are requested (on demand) in control center 402 using HTTP Get requests and write property values with HTTP Put requests. The content of the request may be encoded, for example, as JSON encoded primitive data types. For this example, the system driver 416 may initiate all communication to the adapter 404 and does not need to communicate with the subsystem directly. The adapter 404 manages communication with the subsystem in the native protocol of the subsystem. The system driver 416 may service multiple adapters and may be scaled-up with having multiple system drivers on a control center 402.

The control center 402 obtains the thing descriptions 434 from the adapter 404 and creates the datapoint instances 428. In particular, an auto discovery component 436 of the control center 402 creates instances 428 of the object model based on the description of instances 434 and addresses the properties of the object model with resource addresses, such as Uniform Resource Locators (URLs). When the auto discovery component 436 is initiated, the instances 434 of the objects to be integrated in the building automation system will be discovered or imported and the Read/Write are implemented. Also, the driver and network are identified, the adapter 404 is added, and the resource address of the adapter is identified. Thus, in response to creating the instances 428 and addressing the properties with the resource addresses, the system driver 416 of the control center 402 may initiate operations to communicate with the system adapter 418 of the adapter 404, such as reading and updating the resources. For discovery, all objects, or a portion thereof, that may utilize the adapter 404 will be identified by the auto discovery component 436.

For example, the auto discovery component 436 of the control center 402 may automatically discover all the instances 428 of subsystems created in the adapter 404. The auto discovery component 436 may be driven by the system driver 416, which may send requests as it finds new instances. The auto discovery component 436 may create objects in a process image, add CNS nodes, and add address configurations to all properties.

Figure 5:
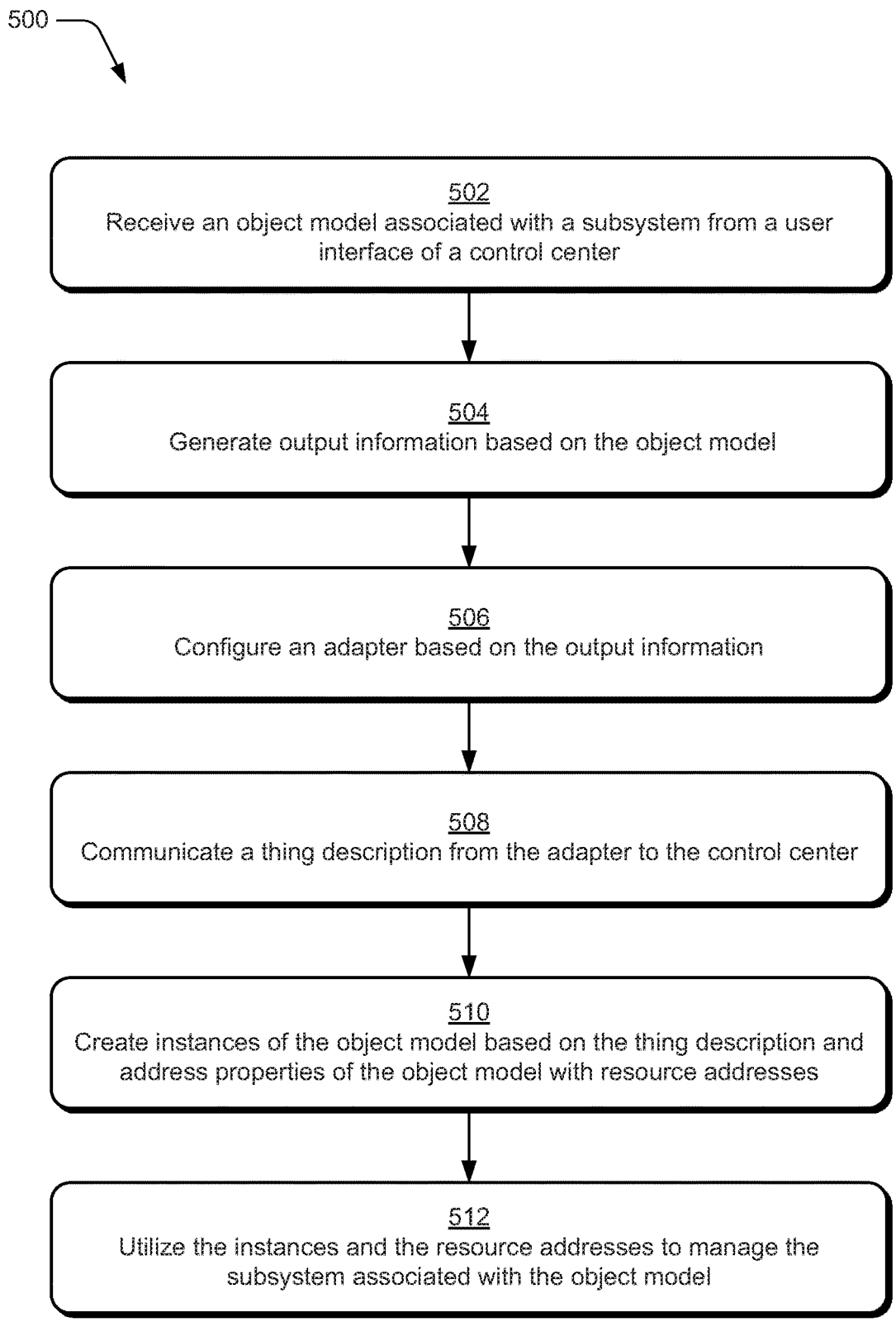
FIG. 5 illustrates a flow diagram representing an operational procedure of the management device of FIG. 2 in accordance with an example embodiment of the present invention.

FIG. 5 illustrates a flow diagram representing an operational procedure of the management device 104, 106, 108. An object model associated with a subsystem of the building automation system is received at a subsystem library of the control center from a user interface of the control center at step 502. The subsystem of the building automation system includes a device to be managed by the control center and associated with at least one of building lighting, building ventilation, building safety, or building security. The object model includes properties associated with the object model. The properties may include at least one of a command or an alert event associated with the object model, which may be used to allow writing of a property or sending alarms for a property.

After developing the object model 408 in the subsystem library 406, output information 422 based on the object model is generated at an extraction tool of the control center at step 504. The output information includes object-oriented classes and programming types representing the object model. Examples of the object-oriented classes of the output information 422 are Resource Description Framework classes. Examples of the programming types include a Java® file or a C# file. The output information 422 may further include a specification document describing the object model as data-definition aspects and endpoints representing the plurality of properties. An example of a specification document is a Swagger file.

In response to generating the output information 422, an adapter 404 is configured based on the output information 422 at step 506. In particular, read ( ) and write( ) techniques are implemented in the adapter 404 based on a code file of the output information 422 so that property values may be read and written between the control center 402 and the adapter. Thus, a first system interface 416 of the control center 402 is mapped to a second system interface 418 of the adapter 404, and the adapter includes read data to read each property of the object model- and write data to write each property of the object model.

After configuring the adapter 404, a thing description 434 is communicated from the second system interface 418 of the adapter 404 to the first system interface 416 of the control center 402 at step 508. The thing description 434 includes a description of instances hosted by the adapter 404 and represents the object model. The thing description 434 may be communicated between the first system interface 416 of the control center 402 to the second system interface 418 of the adapter 404 via Hypertext Transfer Protocol (HTTP).

In response to communication of the thing description 434, instances 428 of the object model are created at an auto discovery component 436 of the control center 402 based on the description of instances at step 510. Also, the properties of the object model are addressed with resource addresses, such as Uniform Resource Locators (URLs). The instances and the resource addresses may be utilized to manage the subsystem associated with the object model at step 512.

Figure 6:
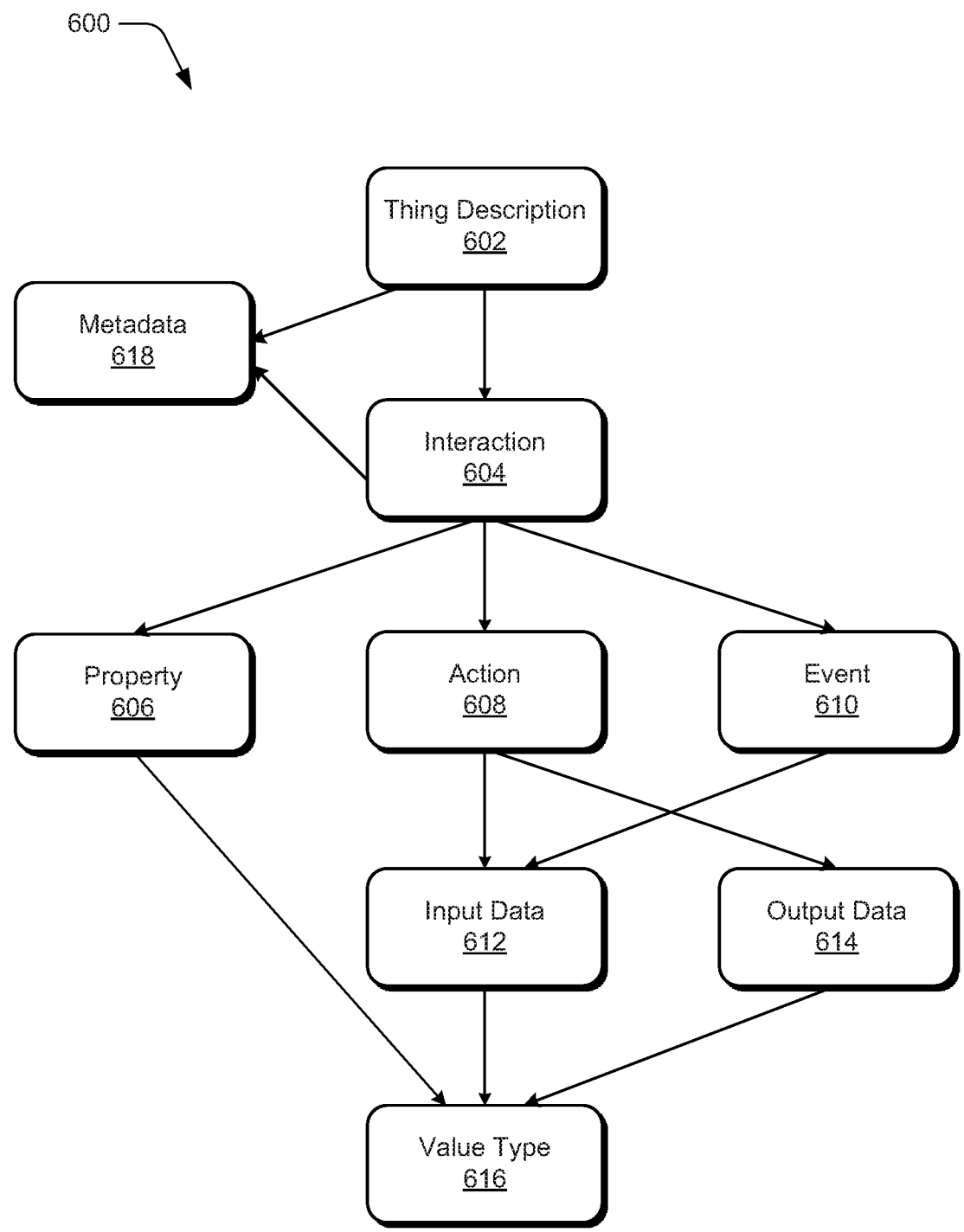
FIG. 6 illustrates a structure diagram representing the thing description of FIG. 4 in accordance with an example embodiment of the present invention.

FIG. 6 illustrates a structure diagram 600 representing the thing description 434, 602 of FIG. 4. The building automation system utilizes information modelling of automation system objects on Web applications. In particular, the building automation system uses RDF as in thing descriptions proposed by the Web of Things (WoT, a working group in W3C). As shown in FIG. 6, the thing description 602 includes interactions 604 that map to a property of the object model and, perhaps, other characteristics. In particular, the thing description 602 describes the interactions of a tangible, or intangible, thing by enumerating associated properties 606 which are state values, actions 608 which are invocation of a state transition, and events 610 which are messages sent by the thing. The actions 608 may include input data 612 and/or output data 614, and the events 610 may include input data 612. The properties 606, actions 608, and events 610 may be associated with value types 616. In addition, the thing and associated interactions may be augmented with any domain specific metadata 618. As such, the thing description 602 helps to encapsulate the resources of a thing as a single coherent entity.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

The invention claimed is:

1. A building automation system providing for integration of subsystems comprising:
a subsystem library of a control center configured to receive an object model associated with a subsystem of the building automation system from a user interface of the control center, wherein the object model includes a plurality of properties associated with the object model;
an extraction tool of the control center configured to generate output information based on the object model, wherein the output information includes object-oriented classes and programming types representing the object model;
an adapter configured based on the output information, wherein:
a first system interface of the control center is mapped to a second system interface of the adapter, and a thing description is communicated from the second system interface of the adapter to the first system interface of the control center, the thing description including a description of instances hosted by the adapter and representing the object model; and
an auto discovery component of the control center creating instances of the object model based on the description of instances and addressing the plurality of properties with resource addresses,
wherein the object-oriented classes are Resource Description Framework classes to decouple any control center dependency in the adapter, and
the output information further includes a specification document describing the object model as data-definition aspects and end points representing the plurality of properties.

2. The system as described in claim 1, wherein the subsystem of the building automation system includes a device to be managed by the control center and associated with at least one of building lighting, building ventilation, building safety, or building security.

3. The system as described in claim 1, wherein the plurality of properties include at least one of a command event or an alert event associated with the object model.

4. The system as described in claim 1, wherein the adapter includes initialize data to identify objects in the subsystem, read data to read each property of the plurality of properties, and write data to write each property of the plurality of properties.

5. The system as described in claim 1, wherein the first system interface of the control center and the second system interface of the adapter communicate via Hypertext Transfer Protocol.

6. The system as described in claim 1, wherein the thing description includes an interaction that maps to a property of the plurality of properties.

7. A method of a building automation system for integration of subsystems, the method comprising:
receiving, at a subsystem library of a control center, an object model associated with a subsystem of the building automation system from a user interface of the control center, wherein the object model includes a plurality of properties associated with the object model;
generating, at an extraction tool of the control center, output information based on the object model, wherein the output information includes object-oriented classes and programming types representing the object model;
configuring an adapter based on the output information, wherein a first system interface of the control center is mapped to a second system interface of the adapter;
communicating a thing description from the second system interface of the adapter to the first system interface of the control center, wherein the thing description includes a description of instances hosted by the adapter and represents the object model; and
creating, at an auto discovery component of the control center, instances of the object model based on the description of instances and addressing the plurality of properties with resource addresses,
wherein the object-oriented classes are Resource Description Framework classes to decouple any control center dependency in the adapter, and the output information further includes a specification document describing the object model as data-definition aspects and end points representing the plurality of properties.

8. The method as described in claim 7, wherein the subsystem of the building automation system includes a device to be managed by the control center and associated with at least one of building lighting, building ventilation, building safety, or building security.

9. The method as described in claim 7, wherein the plurality of properties include at least one of a command event or an alert event associated with the object model.

10. The method as described in claim 7, wherein the adapter includes initialize data to identify objects in the subsystem, read data to read each property of the plurality of properties, and write data to write each property of the plurality of properties.

11. The method as described in claim 7, wherein communicating the thing description from the second system interface of the adapter to the first system interface of the control center includes communicating between the first system interface of the control center and the second system interface of the adapter via Hypertext Transfer Protocol.

12. The method as described in claim 7, wherein the thing description includes an interaction that maps to a property of the plurality of properties.

13. A non-transitory computer readable medium including executable instructions which, when executed, cause at least one processor to provide for integration of subsystems by:
receiving, at a subsystem library of a control center, an object model associated with a subsystem of a building automation system from a user interface of the control center, wherein the object model includes a plurality of properties associated with the object model;
generating, at an extraction tool of the control center, output information based on the object model, wherein the output information includes object-oriented classes and programming types representing the object model;
configuring an adapter based on the output information, wherein a first system interface of the control center is mapped to a second system interface of the adapter;
communicating a thing description from the second system interface of the adapter to the first system interface of the control center, wherein the thing description includes a description of instances hosted by the adapter and represents the object model; and
creating, at an auto discovery component of the control center, instances of the object model based on the description of instances and addressing the plurality of properties with resource addresses,
wherein the object-oriented classes are Resource Description Framework classes to decouple any control center dependency in the adapter, and
the output information further includes a specification document describing the object model as data-definition aspects and end points representing the plurality of properties.

14. The medium as described in claim 13, wherein the subsystem of the building automation system includes a device to be managed by the control center and associated with at least one of building lighting, building ventilation, building safety, or building security.

15. The medium as described in claim 13, wherein the plurality of properties include at least one of a command event or an alert event associated with the object model.

16. The medium as described in claim 13, wherein the adapter includes initialize data to identify objects in the subsystem, read data to read each property of the plurality of properties, and write data to write each property of the plurality of properties.

17. The medium as described in claim 13, wherein communicating the thing description from the adapter to the control center includes communicating between the adapter and the control center via Hypertext Transfer Protocol.

* * * * *